Mar. 3, 1925.
J. FLECKENSTEIN
LIQUID MEASURING APPARATUS
Filed May 25, 1920    2 Sheets-Sheet 1
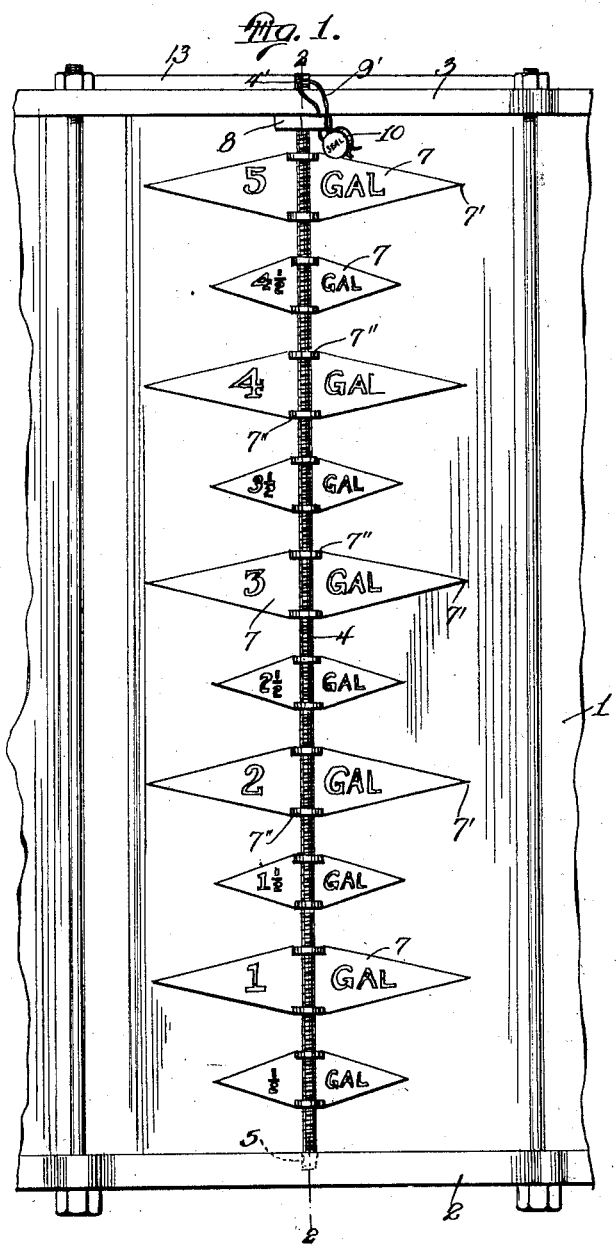
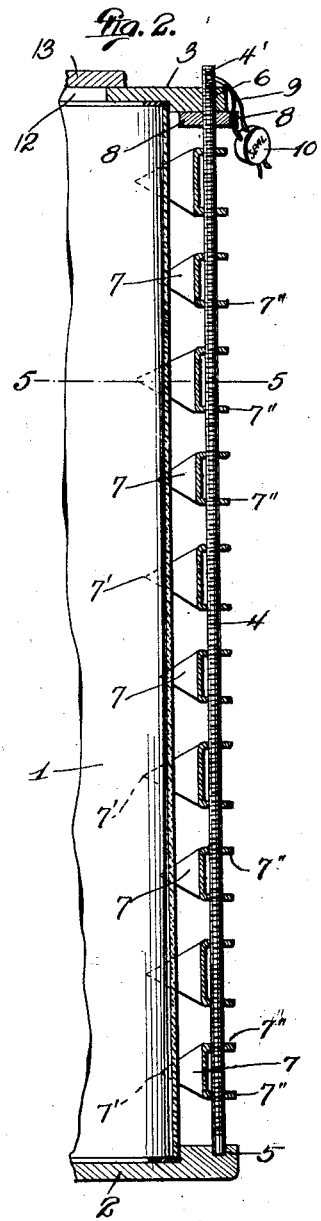
Inventor
Jackson Fleckenstein
By Edgar M Kitchin
his Attorney.

Mar. 3, 1925. 1,528,539
J. FLECKENSTEIN
LIQUID MEASURING APPARATUS
Filed May 25, 1920  2 Sheets-Sheet 2
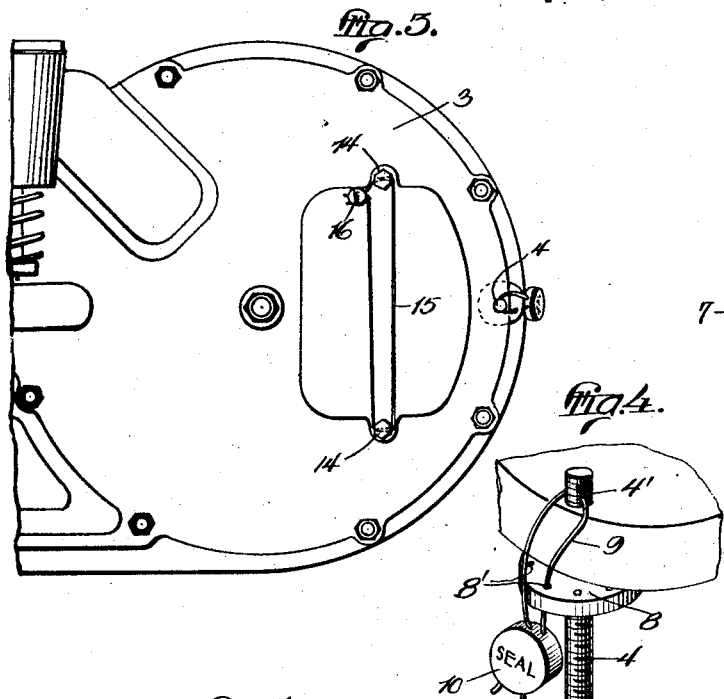
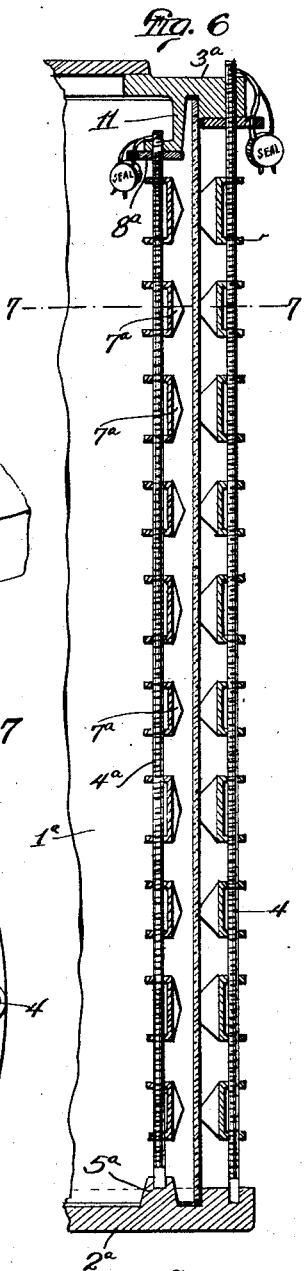
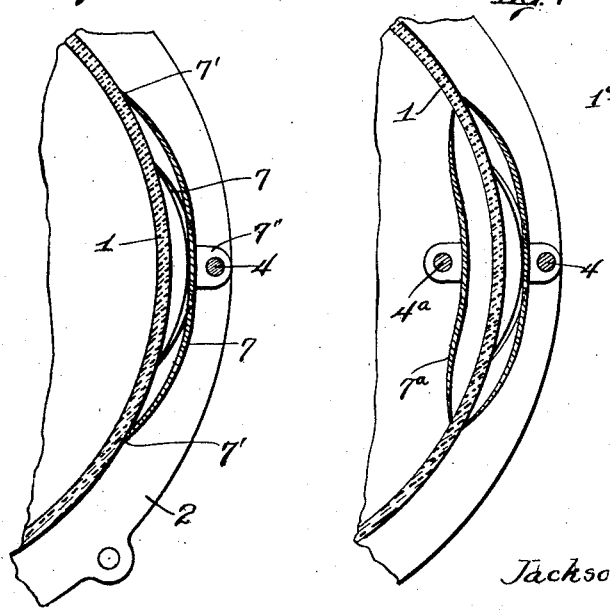
Inventor
Jackson Fleckenstein
By Edgar M. Kitchin
his Attorney Patented Mar. 3, 1925.

1,528,539

UNITED STATES PATENT OFFICE.

JACKSON FLECKENSTEIN, OF GRAND RAPIDS, MICHIGAN, ASSIGNOR TO FLECKEN-STEIN VISIBLE GASOMETER CO. OF MICHIGAN, OF GRAND RAPIDS, MICHIGAN, A CORPORATION OF MICHIGAN.

LIQUID-MEASURING APPARATUS.

Application filed May 25, 1920. Serial No. 384,144.

*To all whom it may concern:*

Be it known that I, JACKSON FLECKENSTEIN, a citizen of the United States, residing at Grand Rapids, in the county of Kent and State of Michigan, have invented certain new and useful Improvements in Liquid-Measuring Apparatus; and I do hereby declare the following to be a full, clear, and exact description of the invention, such as will enable others skilled in the art to which it appertains to make and use the same.

This invention relates to improvements in liquid measuring apparatus, and more particularly to such as are especially adapted to the delivery of hydro-carbon and similar fluid fuel.

The object in view is the rapid, accurate and efficient visual measuring and dispensing of such fuel, and a further object is the provision of means for easily and quickly correcting error in measurement incident to variable conditions, while insuring against unauthorized variation in such measurement.

With these and further objects in view as will in part hereinafter become apparent and in part be stated, the invention comprises certain novel constructions, combinations and arrangements of parts as subsequently specified and claimed.

In the accompanying drawings,—

Figure 1 is a fragmentary, side elevation of an apparatus embodying the features of the present invention.

Figure 2 is a vertical section taken on the plane indicated by line 2—2 of Figure 1.

Figure 3 is a fragmentary plan view.

Figure 4 is an enlarged detail fragmentary perspective showing the seal.

Figure 5 is a transverse section taken on the plane indicated by line 5—5 of Figure 2.

Figure 6 is a view similar to Figure 2 of a slightly modified embodiment.

Figure 7 is a transverse section taken on the plane indicated by line 7—7 of Figure 6.

Referring to the drawings by numerals, 1 indicates a transparent cylinder, preferably of glass, closed at its bottom end by a plate 2 and at its upper by a plate 3, and provided with supply and exhaust pipes and an overflow pipe of the type known in this art and preferably substantially as shown in my co-pending application Serial No. 210,445, filed January 5, 1918, and covering improvements in liquid measuring and dispensing apparatus.

Arranged preferably exteriorly of the cylinder or container 1 is a rod 4 which is preferably screw-threaded substantially throughout its length. The rod 4 has its lower end stepped into a recess or socket 5 in the plate 2, and the upper end of the rod 4 extends through an aperture 6 in plate 3. Threaded onto the rod 4 are pointers or indicators 7, 7. Each indicator 7 may be made in any of numerous ways so long as it is adjustably sustained by some form of threaded engagement or contact with the rod 4. Preferably, however, each pointer 7 consists of a plate tapered to an indicating point 7' and having laterally extending ears 7'', 7'' formed with threaded apertures through which the rod 4 is screwed. Each plate 7 is curved to conform to the curvature of the wall of cylinder 1 and may be provided with a point 7' at each end, it being understood, of course, that each point 7' is to be located coincident with the liquid level within the container for a predetermined quantity of liquid. The several pointers or plates 7 are preferably provided with indicia or appropriate legends announcing the quantity of liquid contained when the level reaches the line of the point or points 7' of the particular pointer 7. The pointers or indicators 7 may be arranged in such numbers and variations of size as to indicate whole numbers and fractional quantities, as, for example, gallons and half gallons, or any other divisions according to the need or desire of the particular user.

It will be recognized, of course, that the primary but somewhat superficial use of the indicators 7 is to show to the consumer, to whom the liquid fuel is being dispensed, the quantity being delivered, but a further and more important use is to enable official inspection and maintenance of standard conditions. To this end, a seal is provided for preventing unauthorized adjustment of the pointers 7. This seal may take any of various forms, one of the simplest and more efficient being shown and consisting of a nut 8 threaded on rod 4 near the upper end thereof and arranged beneath the plate 3, the nut 8 being formed with a series of apertures 8' and the upper end of rod 4 which projects above the upper surface of plate 3 being formed with an aperture 4', and a sealing wire 9 being passed through the aperture 4' and one of the apertures 8' and having its ends secured by the usual official seal 10.

When the present improved dispensing apparatus is marketed, it is carefully calibrated so that the pointers 7 register accurately, but if in mounting the container or by subsequent accident or otherwise it assumes a slightly angular position, the calibration may thereby be rendered inaccurate, as the liquid level could be thus raised at one point and lowered at a diametrically opposite point. The inspector or other authorized official observing the discrepancy will not find it necessary, as has happened with previously known types of indicators, to condemn the entire apparatus and cause it to be discarded at great loss, but all he will need to do will be to break the seal 10, make a readjustment and place the apparatus under a new seal. To effect the readjustment, it is only necessary to remove the wire 9, rotate the nut 8 until it is backed down the rod 4 a distance sufficient to enable the rod to have its lower end lifted from the socket 5 and the rod thus freed for withdrawal, and after withdrawal to rotate the several pointers 7 about the rod to whatever extent and in whatever direction may be necessary for accurate calibration under the new conditions. After the readjustment has been made, the upper end of the rod 4 is introduced in the opening 6 from beneath plate 3 and the lower end of the rod is dropped into socket 5. Then the nut 8 is screwed back up into contact with the under surface of plate 3, a wire is threaded through apertures 4' and 8', and a seal is applied to the ends of the wire to prevent unauthorized removal thereof. Several apertures 8' are preferably provided to faciliate adjustment of nut 8.

In some cases it is required to provide a gauge within the container, and in that event a duplicate of the exterior gauge just described is provided, preferably in addition to the exterior gauge as seen in the embodiment shown in Figure 6. In this modified embodiment, a socket 5$^a$ upstands from the inner surface of plate 2$^a$ and a threaded rod 4$^a$ is stepped into the socket 5$^a$ and has its upper end portion extending through the aperture in a bracket 11 projecting from the upper plate 3$^a$ within the transparent cylinder 1$^a$. Indicators 7$^a$ similar in construction and arrangement to indicators 7 are threaded onto rod 4$^a$. A retaining nut 8$^a$ is arranged on rod 4$^a$ just beneath bracket 11 and is sealed for retaining the rod against adjustment in the same manner as the sealing of rod 4.

Since it would be undesirable and require a great deal of labor and loss of time to disconnect pipes and other parts to enable removal of the plate 3 (or 3$^a$) and as access to the interior of the transparent cylinder is desirable to enable cleansing of the cylinder and also to enable adjustment of the indicators 7$^a$, I form plate 3 with a hand-hole or aperture 12 sealed by a plate 13 held in place by cap screws 14 threaded into plate 3. The heads of screws 14 are apertured and a sealing wire 15 is passed therethrough and has its ends secured by an official seal 16.

What is claimed is:—

1. In liquid measuring apparatus, the combination, with a container, of indicators extending adjacent the vertical wall of the container and conforming generally to the contour of and at points engaging said wall for being held thereby against lateral movement, a support for the indicators removably carried by the container and adapted for simultaneous adjustment of all of said indicators, the indicators having an engagement with the support adapted to enable independent adjustment of each indicator, the independent adjustment being prevented by the engagement of the indicators with the container wall, and means for sealing the support against movement.

2. In liquid measuring apparatus, the combination, with a transparent cylinder and end plates closing the cylinder, of a threaded rod extending along the cylinder, removably stepped into a portion of one of the plates at one end of the rod and extending through the other plate at the other end of the rod, indicators for showing the quantity contained in the cylinder, a projection extending from each indicator and having a threaded aperture and threaded onto the rod, each indicator being proportioned to engage the cylinder and be prevented by the cylinder from having rotational movement on the rod, and means for sealing the rod against movement.

In testimony whereof I affix my signature in presence of two witnesses.

JACKSON FLECKENSTEIN.

Witnesses:
 EDGAR M. KITCHIN,
 CHRISTIE H. FESLER.